US007208240B2

(12) United States Patent
Hartley

(10) Patent No.: US 7,208,240 B2
(45) Date of Patent: Apr. 24, 2007

(54) FUEL CELL WITH IONIZATION MEMBRANE

(75) Inventor: Frank T. Hartley, Arcadia, CA (US)

(73) Assignee: Ionfinity LLC, Pasadena, CA (US)

( * ) Notice: Subject to any disclaimer, the term of this patent is extended or adjusted under 35 U.S.C. 154(b) by 258 days.

(21) Appl. No.: 10/786,232

(22) Filed: Feb. 26, 2004

(65) Prior Publication Data

US 2004/0229104 A1 Nov. 18, 2004

Related U.S. Application Data

(60) Continuation of application No. 10/452,343, filed on Jun. 2, 2003, now Pat. No. 6,828,552, which is a division of application No. 10/180,813, filed on Jun. 25, 2002, now Pat. No. 6,642,526.

(60) Provisional application No. 60/347,685, filed on Jan. 8, 2002, provisional application No. 60/336,841, filed on Oct. 31, 2001, provisional application No. 60/301,092, filed on Jun. 25, 2001.

(51) Int. Cl.
*H01M 8/06* (2006.01)

(52) U.S. Cl. .......................................... 429/19; 429/21

(58) Field of Classification Search ............ 250/423 R, 250/423 F; 429/19, 21; 427/115
See application file for complete search history.

(56) References Cited

U.S. PATENT DOCUMENTS

| | | | | |
|---|---|---|---|---|
| 4,447,761 | A * | 5/1984 | Stinnett | 250/423 R X |
| 4,926,056 | A * | 5/1990 | Spindt | 250/423 F |
| 5,075,594 | A * | 12/1991 | Schumacher et al. | 250/423 F |
| 6,452,167 | B1 * | 9/2002 | Felter | 250/423 R X |
| 6,642,526 | B2 * | 11/2003 | Hartley | 250/423 F |

* cited by examiner

*Primary Examiner*—Stephen J. Kalafut
(74) *Attorney, Agent, or Firm*—Mintz, Levin, Cohn, Ferris, Glovsky, and Popeo, P.C.

(57) ABSTRACT

A fuel cell is disclosed comprising an ionization membrane having at least one area through which gas is passed, and which ionizes the gas passing therethrough, and a cathode for receiving the ions generated by the ionization membrane. The ionization membrane may include one or more openings in the membrane with electrodes that are located closer than a mean free path of molecules within the gas to be ionized. Methods of manufacture are also provided.

31 Claims, 4 Drawing Sheets

FUEL CELL WITH IONIZATION MEMBRANE

This application is a continuation of U.S. patent application Ser. No. 10/452,343 filed Jun. 2, 2003 now U.S. Pat. No. 6,828,552, which is a divisional of U.S. patent application Ser. No. 10/180,813 entitled "Field Ionizing Elements and Applications Thereof" filed Jun. 25, 2002, now U.S. Pat. No. 6,642,526, which claims benefit of U.S. Provisional Application No. 60/301,092, filed Jun. 25, 2001, U.S. Provisional Application No. 60/336,841 filed on Oct. 31, 2001, and U.S. Provisional Application No. 60/347,685 filed on Jan. 8, 2002, all of which are hereby fully incorporated by reference.

This invention was made in part with Government support under contract NASA-1407 awarded by NASA. The Government has certain rights in this invention.

BACKGROUND

Many different applications are possible for ionization systems. For example, it is desirable to form a pumpless, low mass sampling system for a mass spectrometer.

Conventional mass spectrometers often use "hard" techniques of producing ion fragments, in which certain parts of the molecule are forcibly removed, to form the fragmented ion. For example, the fragments may be produced by ultraviolet, radioactive, and/or thermal electron ionization techniques. Some of these techniques, and specifically the thermal technique, may require a vacuum to enhance the life of the filament source.

Different systems which use ionization are known. A quadrupole and magnetic sector/time of flight system ionizes a sample to determine its content. These devices have limitations in both operation and size. Many devices of this type may operate over only a relatively small mass sampling range. These devices may also suffer from efficiency issues, that is the ions might not be efficiently formed.

Many of these systems also require a very high vacuum to avoid ion collisions during passage through the instrument. For example, the systems may require a vacuum of the level of such as $10^{-6}$ Torr. A vacuum pump must be provided to maintain this vacuum. The vacuum pump consumes power, may be heavy, and also requires a relatively leak free environment. This clashes with the usual desire to miniaturize the size of such a device.

Other applications could be desirable for ionization, if an ionization system were sufficiently small. However, the existing ionization systems have problems and difficulties in fabrication which has prevented them from being used in certain applications.

SUMMARY

The present application describes a special ionization membrane, along with applications of this special ionization membrane that are facilitated by the membrane.

A first application uses the ionization membrane as part of a mass spectrometer.

Another application uses the ionization membrane for other applications. According to an aspect of this invention, the electrodes are formed closer than the mean free path of a specified gas, for example the gas being considered. This may ionize gas molecules in free space. Different applications of this soft ionization technique are described including using this system in a mass spectrometer system, such as a rotating field mass spectrometer. This may also be used in a time of flight system.

In an embodiment, a pumpless mass spectrometer is described which does not include a pump for either forming the vacuum or for driving the ions.

Another embodiment describes using this system for an electrochemical system. Another application describes using this system in propulsion.

BRIEF DESCRIPTION OF THE DRAWINGS

These and other aspects will now be described in detail with reference to the accompanying drawings, wherein.

DETAILED DESCRIPTION

Gas may be ionized in a high electric field. Avalanche arcing may be produced by the gas ionization. It has been found by the present inventor, however, that when the "mean free path" between molecules is greater than electrode separation, only ionization occurs.

Figure 1:
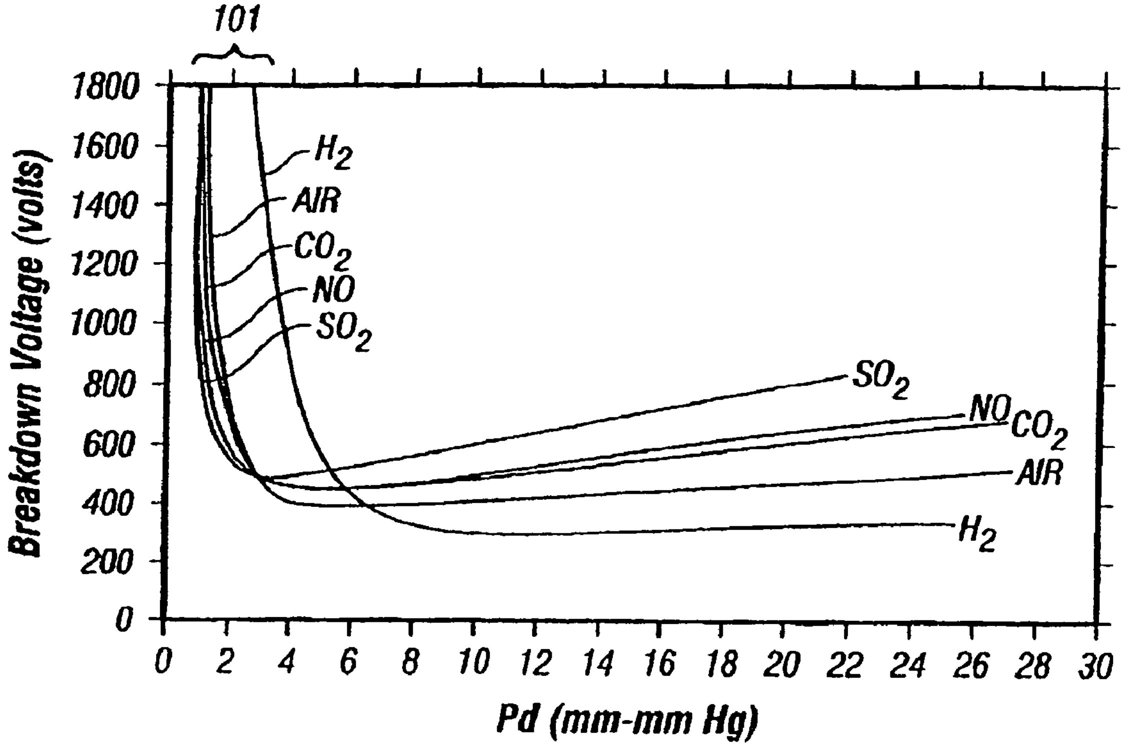
FIG. 1 shows Paschen curves for various gases.

FIG. 1 shows the Paschen curves for various gases. This represents the breakdown voltage of the gas at various characteristic points. On the left side and under each Paschen curves ionization of the gas occurs using the special membrane described herein. This technique is "soft" in the sense that it ionizes without fragmenting the molecular structure of the gas being ionized. That means that large organic compounds can be analyzed without breaking them into smaller atomic fragments.

Figure 2A:
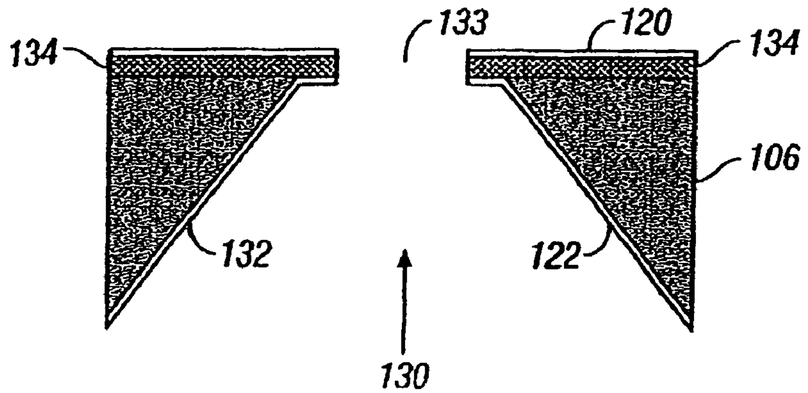
FIGS. 2*a*–2*c* show details of the special ionization membrane of the present system, with FIG. 2*b* showing a cross-section along the line 2*b*—2*b* in FIG. 2*c* and FIG. 2*a* showing a close-up detail of one of the holes in FIG. 2*b;*
Figure 2B:
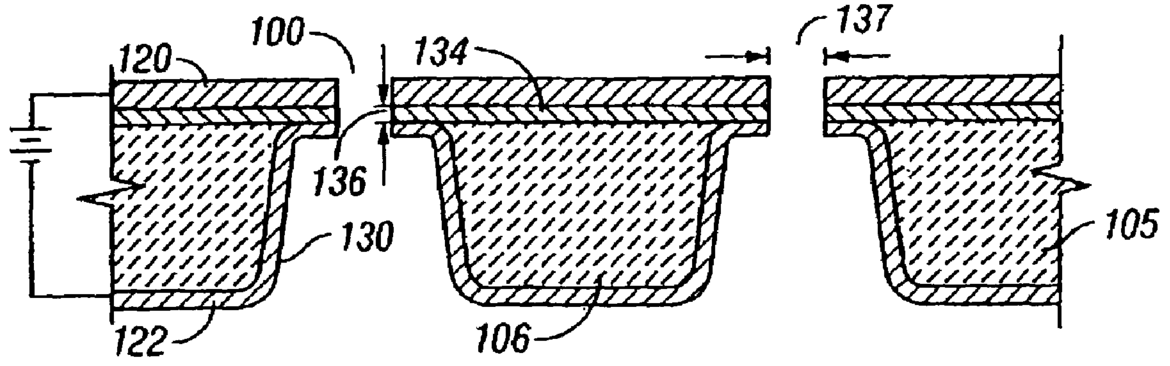
Figure 2C:
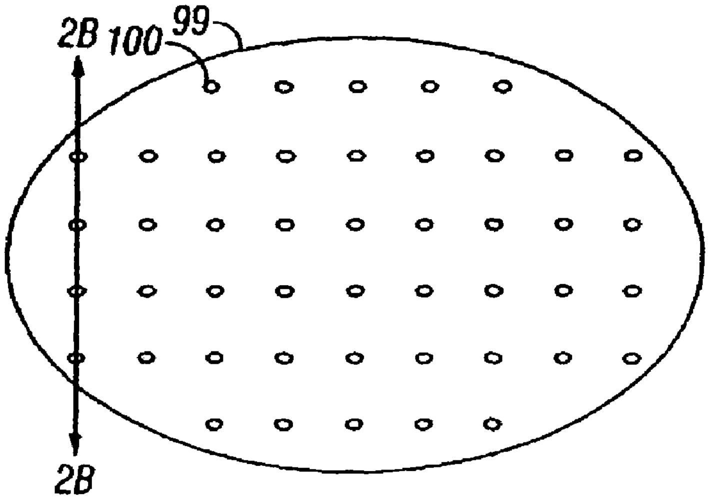

Details of the membrane are shown in FIGS. 2A–2C, with FIGS. 2A & 2B showing cross sections of the membrane of FIG. 2C. The miniature ionization device 99 is formed by micromachining an array of small holes 100 through a relatively thin membrane 105. The membrane 105 may be, for example, of sub micron thickness. The material 106 of the substrate itself may be silicon or any other easy-to-machine material. Metal electrodes 120,122 are located on respective sides of the membrane 100. The metal can be any material such as chrome or titanium or gold.

In formation of the membrane 99, a plurality of holes such as 130 are formed from the bottom 132. The holes may generally taper as shown towards the top portion 133 of the hole. The top portion 133 of the hole 130 may have a dimension 137 which may be, for example, 2 to 3 microns. Openings may be formed in the top metal coating 120, and in the bottom metal coating 122. For example, the hole may be formed by focused ion-beam milling (maskless process).

The substrate material 106 also includes a dielectric layer 134 which can be for example, silicon nitride, alumina, or any other similar material that has a similar dielectric breakdown. The thickness 136 of the dielectric layer sets the distance between the metal electrodes 120 and 122. The dielectric thickness can be to 200–300 nm The dielectric can in fact be thinner than 200 nm, in fact can be any thickness, with thicknesses of 50 nm being possible.

In a preferred system, the distance between the electrodes 120, 122 is less than 1 micron. When this small separation is maintained, electric field strengths on the range of mega volts per meter are produced for each volt of potential difference between the electrodes 120, 122.

The inventor has noted that the membranes could not be formed simply from the thin, sub micron elements. Membranes that are formed in this way could be too fragile to sustain a pressure difference across the membrane, or to survive a minor mechanical shock. In this embodiment, the thicker supporting substrate part 105 is used, and is back-etched through to the membrane. By forming the substrate in this way, that is with a relatively thick substrate portions such as 105/106, separated by back etched holes such as 100, the structure of the device can be maintained while keeping a relatively small distance between the electrodes.

An embodiment is described herein which uses the field ionizer array, which may be a micromachined field ionizer membrane, with a lateral accelerator, which is coupled to a mass spectrometer. An array of cathodes may be deployed to detect the position of impinging of the particles.

The cathode electrodes may be derived from an active pixel sensor array of the type described in U.S. Pat. No. 5,471,215, and as conventional may include various types of on-chip matrix processing. This system may use an electrode sensor of 1024 by 1024 pixels, with sub pixel centroiding and radial integration. The active pixel sensor itself may have a sensitivity on the order of $10^{-17}$ amps. By adding pixel current processing, another two orders of magnitude of sensitivity may be obtained.

Forming the mass spectrometer in this way enables the device to be formed smaller, lighter, and with less cost than other devices of this type. This enables a whole range of applications; such as in situ biomedical sampling. One application is use of the miniature mass spectrometer is for a breathalyzer. Since there are no electron beam filaments and the like, any of the system components can operate at relatively higher pressures, for example 5 to 7 Torr pressures or higher. With a Faraday cup electrometer ion detector, sub femtoamp levels of sensitivity may be obtained. This system could be used as a portable device for finding various characteristics in exhaled breath. For example, detection of carbon monoxide in exhaled breath may be used as a screening diagnostic for diabetes.

Figure 3:
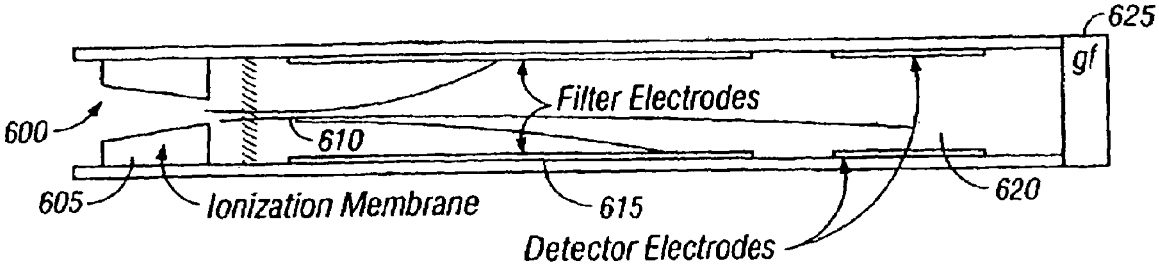
FIG. 3 shows an ion mobility spectrometer.

Another application of this system is for use in a miniature ion mobility spectrometer as shown in FIG. 3. Conventional ion mobility spectrometers use a shutter gate. This provides short pulses of ions. The shortened pulses of ions are often limited to about 1 percent of the total number of ions that are available for detection. However, resolution of such a device is related to the width of the ion pulse. The width of the ion pulse cannot be increased without correspondingly decreasing the resolution.

In the improved system of FIG. 3, total and continuous ionization of sample gas and continuous introduction of all ions into the chamber is enabled. Sample gases are introduced as 600 into the ionization membrane 605 of the type described above. In general, the ionization membrane 605 could include either a single pore device or could have multiple pores within the device.

Ions 610 from the membrane exit the membrane as an ion stream. Electrons in contrast move back behind (that is, to the other side of) the membrane, and may further contribute to the ionization of the incoming gases. The atoms or molecules are carried through the body of the spectrometer by a gas feed system 625. The gas feed system includes either an upstream carrier gas supply and Venturi sampler, or a downstream peristaltic pump.

The ions are drawn towards the filter electrode 615 which receive alternating and/or swept DC electric fields, for the transverse dispersal of the ions. A repetitive ramping of the DC fields sweeps through the spectrum of ion species.

An important feature of this device is the high field strengths which can be obtained. At moderate field strengths, for example <100,000 volts per meter, the mobility of ions at atmospheric and moderate pressures is constant. However, at higher field strengths, such as 2 million volts per meter or greater, the mobility of the ions is nonlinear. The mobility changes differentially for high and low mobility ions. This change may be, for example, by 20 percent. Therefore, by applying a waveform that is formed of a short high-voltage and a long low or negative voltage to the filter electrodes, the ion species is disbursed between the filter electrodes. This waveform may be selected to provide a zero time averaged field. In operation, the ions are transported laterally by a carrier gas stream. A low strength DC field may be supplied in opposition to the other field. This fields applied to the filter electrode may straighten the trajectory of specific ion species, allowing their passage through the filter. The other ion species collide with the electrodes. Sweeping of the DC field may facilitate detection of the complete ion spectrum.

Detector electrodes 620 are located downstream of the filter electrodes 615. The selected ions have straightened trajectories, and these detector electrodes 620 deflect the straightened-trajectory ions into detection electrodes, where they are detected. The detected current provides a direct measure of the number of ions. The number of ions is effectively proportional to the vapor concentration.

It should be understood that this gas feed system could be either upstream or downstream in this way.

Another embodiment uses this ionization technique to form a free space ion thruster.

Figure 4:
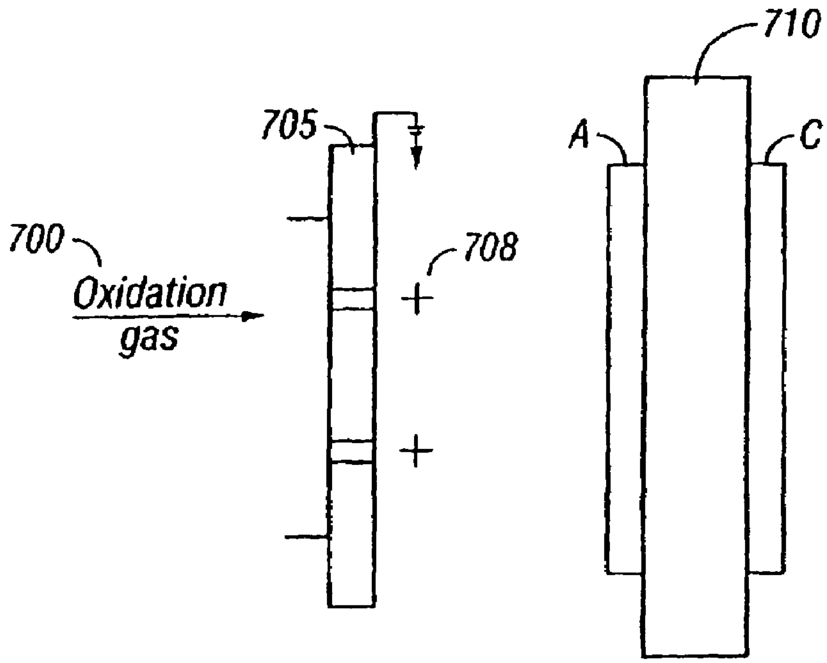
FIG. 4 shows a solid-state ionization membrane being used in an electrochemical device.

Yet another embodiment describes use of an ionizer of this type in a fuel cell. Previous fuel cell proton exchange membranes have used platinum or other electrooxidation catalysts to facilitate proton transfer. In this system, the oxidation gas or gases 700 is passed through the pores of a membrane 705 under an extreme electric field as shown in FIG. 4. The oxidation gas or gases 700 are completely ionized on passage through the membrane. The gas 708 once ionized, now has a positively charged aspect. The gas 708 drifts to the membrane 710 where the electrooxidized state of the gas enhances its transfer through the cathode. The transfer of atomic species through the membrane in this way reduces the partial pressure between the ionizer 705 and the membrane 710, this causing further inflow through the ionizer pores of the oxidation gas 702. The ionizer potential may alternatively be maintained positive with respect to the cathode membrane in order to accelerate the ions to an increased velocity before imprinting on the cathode membrane which forms the accelerator grid.

Figure 5:
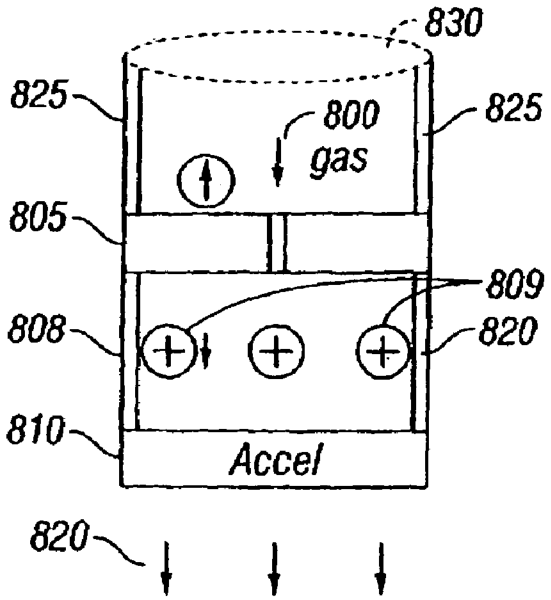
FIG. 5 shows the ionization membrane being used as a propulsion system.

Another embodiment, shown in FIG. 5, uses this ionization membrane as part of a miniature ion thruster. This may form a thrust system using propellant gas. Propellant gas 800 is ionized by passing it through the pores of a membrane 805 of the type described above, under a high electric field. This forms positively charged ions 809 from the gas. The ions 809 enter another field 808 between the membrane and a porous accelerator grid 810. This other field 808 accelerates the ions to an increased velocity, and expels them from the thruster as 820.

The electrons are caused to move back behind the membrane where a small electric field and magnetic field may linearly and rotationally accelerate the electron beam around to eject the electrons from the thruster with the same vector but reduced velocity as the ion beam. Since the ion and electron currents are substantially identical, this system becomes effectively charge neutral.

This system may use a small tube 820 of 1.5 cm long; 2 mm in diameter, of dielectric materials such as quartz. The tube 820 may be eutectically bonded to the top of the membrane 805. The micromachined conductive grid is similarly affixed to the top of the tube. The bottom of the membrane may also be eutecticly bonded to a thruster housing 825. That housing may contain another accelerating grid 830 and magnets.

Figure 6:
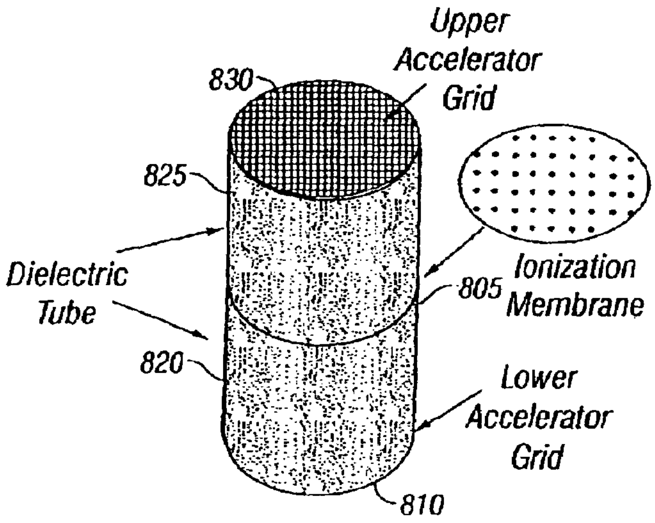
FIG. 6 shows this propulsion system in its housing with top and bottom accelerator grids.

An exterior view of the structure is shown in FIG. 6, which shows the tube for any particular accelerator grid potential, the thrust of the engine is determined by the gas flow through the membrane pores. This system may use a plurality of miniature ionization tubes such as the one described above, that are disbursed across the surface of the structure. These tubes may be deployed individually or collectively by connecting them into a circuit. The ions from each of these tubes are accelerated under the influence of a localized electric field that is along the vector representing the least distance to the peripheral grid. The aggregate thrust is the geometrically integrated mass-momentum of all connected free space ion thrusters.

In this embodiment, a bipolar ion thruster may allow reversing the electrode potentials on the ionization membrane, causing the electrons to pass through the membrane, while ions move behind the membrane. The high velocity ions are expelled from the front of the thruster, and electrons are expelled from the rear of the thruster. This engine can therefore be reversed in this way.

Figure 7:
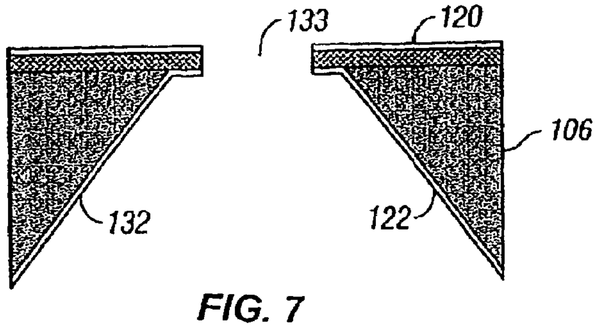
FIG. 7 shows an aperture to carry the gas into the ionization field.

When used in a vacuum, a low-pressure gas may need to be introduced into the membrane aperture that has a velocity sufficient to carry the gas into the ionization field. FIG. 7 shows an illustration of the way gas expands in a vacuum and has its molecules accelerated to supersonic speed while cooling, and directed through the membrane. Once ionized, the accelerating ions will create a partial vacuum behind them, which partial vacuum encourages further gas flow through the membrane. Gas that remains behind the membrane is ionized, and its negative field directs those ions through the membrane.

This system may have many different applications including biomedical applications such as a breath analyzer, as well as applications in other systems. It may have applications environment monitoring, personal monitoring, reviewing of water quality, automobile MAP control, detection of explosives, chemical and biological agent detection, and in an artificial nose type product.

What is claimed is:

1. A fuel cell, comprising:

an ionization membrane having at least one area through which gas is passed, and which ionizes the gas passing therethrough; and a membrane electrode assembly comprising:

an anode for receiving electrons generated by said ionization membrane;

a cathode for receiving the ions generated by said ionization membrane; and a proton exchange membrane disposed between the anode and the cathode.

2. The fuel cell of claim 1 wherein the at least one area of said ionization membrane includes an opening in the membrane with electrodes that are located closer than a mean free path of molecules within the gas.

3. The fuel cell of claim 1 wherein the ionization membrane has one of said areas.

4. The fuel cell of claim 1 wherein the ionization membrane has a plurality of said areas.

5. The fuel cell of claim 1 wherein said ionization membrane comprises: an ionizing device, comprising an insulating element having at least one opening, a first conductive electrode extending on a first surface of said insulating element at the at least one opening and a second conductive electrode extending on a second surface of the insulating element at the at least one opening, wherein said insulating element separates said first and second conductive electrodes at said at least one opening by a thickness less than the mean free path of the molecules within the gas being ionized.

6. The fuel cell of claim 5 wherein said first and second conductive electrodes are separated by less than 1 micron at the at least one opening.

7. The fuel cell of claim 6 wherein said first and second conductive electrodes are separated by less than 300 nm at the at least one opening.

8. The fuel cell of claim 7 wherein said first and second conductive electrodes are separated by less than 200 nm at the at least one opening.

9. The fuel cell of claim 8 wherein said first and second conductive electrodes are separated by approximately 50 nm at the at least one opening.

10. The fuel cell of claim 5 wherein the at least one opening tapers inwardly from the first surface of said insulating element to the second surface of said insulating element.

11. The fuel cell of claim 5 further comprising a substrate disposed between said first and second conductive electrodes for providing structural support.

12. The fuel cell of claim 5 wherein the at least one opening has a diameter approximately in the range of 2–3 microns.

13. The fuel cell of claim 5 wherein said first and second electrodes are formed of at least one of gold, chrome or titanium.

14. The fuel cell of claim 5 wherein said insulating element is formed of silicon nitride or alumina.

15. The fuel cell of claim 1 wherein ion potential is maintained positive with respect to said cathode to accelerate the ions before imprinting on said cathode.

16. The fuel cell of claim 1 wherein ions pass through said proton exchange membrane and generate a vacuum in a direction from said ionization device to said proton exchange membrane.

17. A method of forming a fuel cell comprising: forming a layer of dielectric material on a substrate that has a first specified thickness of a sufficient thickness to maintain structural integrity; forming a first electrode on the first surface of said dielectric material, said first electrode being formed of a metal material; forming at least one hole in said substrate; forming a second electrode on a second surface of the substrate including the at least one holes, such that at least a portion of the second electrode is on a second surface of the dielectric material; forming holes in the second electrode, dielectric material and the first electrode, which holes have side surfaces where the first and second electrodes are separated by a width of the dielectric material; and providing a membrane electrode assembly comprising: an anode for receiving generated electrons, a cathode for receiving generated ions, a proton exchange disposed between the anode and the cathode.

18. The method of claim 17 wherein said dielectric material has a thickness which is less than the mean free path of the gas molecules intended to be ionized.

19. The method claim 17 wherein the step of forming electrodes comprises depositing at least one of gold, chrome, or titanium.

20. The method of claim 17 wherein the step of forming a dielectric comprises depositing silicon nitride or alumna.

21. The method of claim 17 wherein said dielectric has a thickness less than 1 micron.

22. The method of claim 21 wherein said dielectric has a thickness less than 500 nm.

23. The method of claim 22 wherein said dielectric has a thickness less than 300 nm.

24. The method of claim 23 wherein said dielectric has a thickness of approximately 50 nm.

25. The method of claim 17 further comprising the step of applying a voltage less than 15 volts between said first and second electrodes to form a field between said first and second electrodes in the range tens to hundreds of megavolts per meter.

26. The method of claim 17 wherein said forming holes in said first and second electrode and said dielectric material comprises ion-beam milling.

27. The method of claim 17 wherein the at least one hole formed in said substrate forms at least one hole tapered inwardly.

28. The method of claim 17 wherein the holes formed in said first and second electrodes and said dielectric material are approximately 2–3 microns in diameter.

29. The method of claim 17 wherein said cathode is a proton exchange membrane.

30. A fuel cell, comprising: ionization means for ionizing gas passing therethrough having first and second conductive electrodes having a spacing less than the mean free path of molecules within the gas being ionized; anodic means for receiving electrons generated by said ionization means; cathodic means for receiving the ions generated by said ionization means; and a proton exchange membrane disposed between the anodic means and the cathodic means.

31. The fuel cell of claim 30 further comprising anodic means for receiving electrons generated by said ionization means.

* * * * *